May 22, 1923.  1,456,484
L. D. FALCONER
TOOL FOR APPLYING AND REMOVING TIRE CHAINS
Filed Jan. 20, 1922
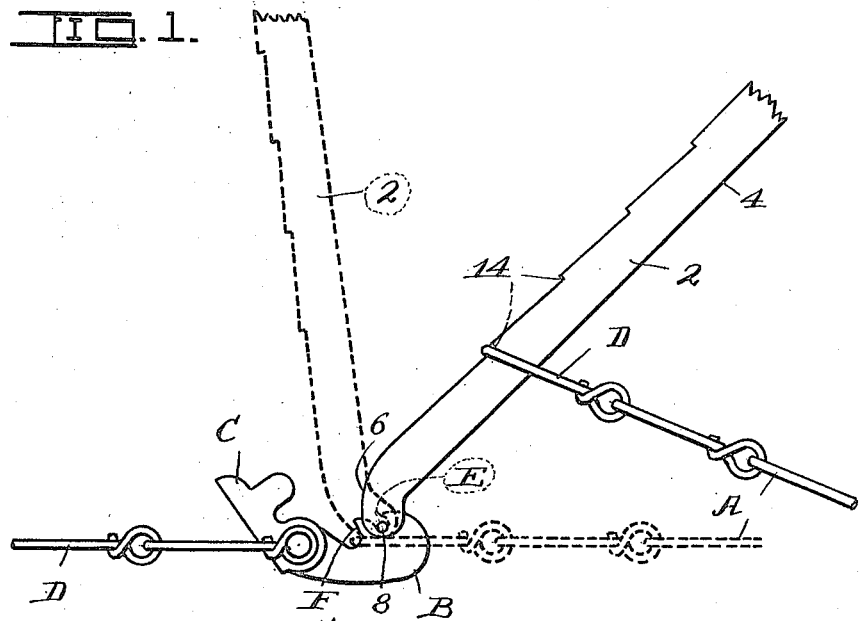
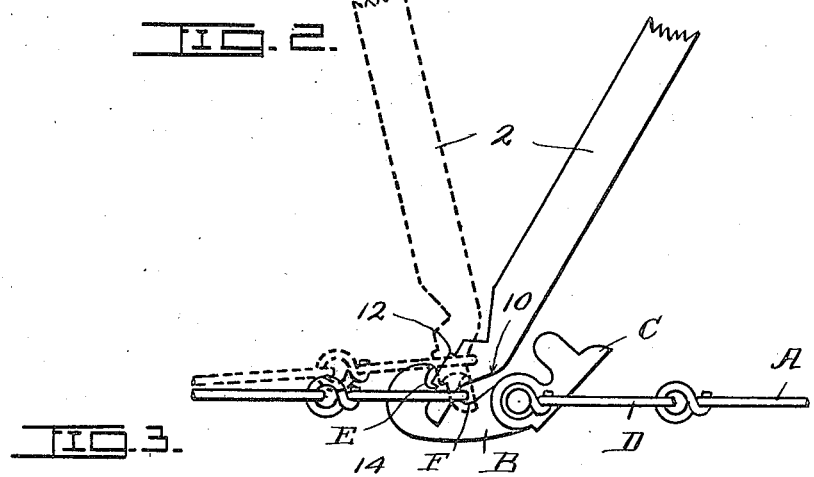
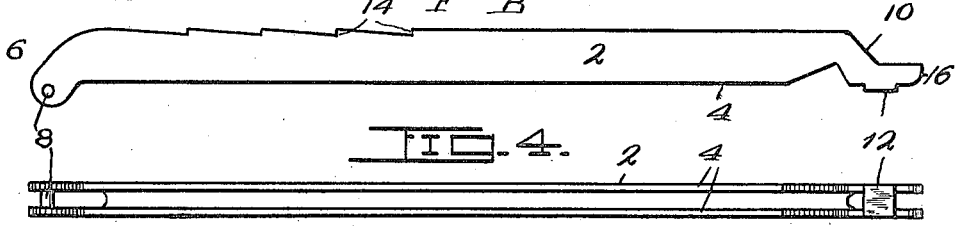
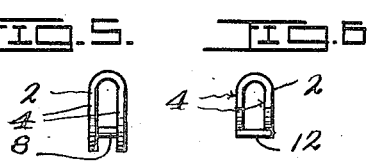
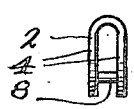
Witness:
Fred C. Fischer.
INVENTOR:
Leroy D. Falconer,
BY
F. G. Fischer
ATTORNEY.

Patented May 22, 1923.

1,456,484

UNITED STATES PATENT OFFICE.

LEROY D. FALCONER, OF BETHEL, KANSAS, ASSIGNOR TO EDWARD E. STEPHENS, OF KANSAS CITY, MISSOURI.

TOOL FOR APPLYING AND REMOVING TIRE CHAINS.

Application filed January 20, 1922. Serial No. 530,642.

*To all whom it may concern:*

Be it known that I, LEROY D. FALCONER, a citizen of the United States, residing at Bethel, in the county of Wyandotte and State of Kansas, have invented certain new and useful Improvements in Tools for Applying and Removing Tire Chains, of which the following is a specification.

My invention relates to a tool for applying and removing antiskid tire chains, and one object is to provide a tool of this type which may be constructed from one piece of sheet metal.

A further object is to provide a tool whereby chains may be applied or removed from tires with but little physical effort on the part of the operator.

A further object is to provide a tool possessing the above features which may be manufactured and placed on the market at minimum cost.

In order that the invention may be fully understood, reference will now be had to the accompanying drawings, in which:

Fig. 1 is a broken side elevation showing the manner in which the ends of the chain are connected.

Fig. 2 is a broken side elevation showing the manner in which the ends of the chain are disconnected.

Fig. 3 is a detail side elevation of the tool.

Fig. 4 is an inverted plan view of the tool.

Fig. 5 is an elevation of one end of the tool.

Fig. 6 is an elevation of the opposite end of the tool.

Referring now in detail to the different parts, A designates a conventional form of tire chain which is provided at one end with a hook B equipped with a keeper C.

2 designates the tool which constitutes the present invention. Said tool is, preferably, made from sheet metal of proper gage which is bent longitudinally into U-form to provide spaced parallel flanges 4 adapted to straddle the hook B. One end of each flange 4 is bent downwardly as indicated at 6, and said flanges are united by a transverse pin 8, which constitutes a fulcrum when connecting the ends of the tire chain A.

The opposite end of each flange 4 also extends downwardly as indicated at 10 and thence forwardly to form a nose 16, and said flanges are united by a rigidly secured transverse member 12, which constitutes a fulcrum when disconnecting the ends of the tire chain A.

The longitudinal upper portion of the tool 2 has a series of shoulders 14 any of which are adapted to engage any of the links D of the chain A.

In practice the tire chain A is placed upon the tire (not shown) in the usual manner. The tool 2 is then passed through one of the links D of said chain while the pin 8 is engaged in a notch E of the hook B. The tool is then rocked from the full line position to the dotted line position, Fig. 1, so that the link D will slip downwardly from its position against one of the shoulders 14 and into the registering notch F of the hook B.

In order to disconnect the ends of the tire chain the tool 2 is reversed and the nose 16 is placed through the link engaging the hook B of the chain A, after which said tool 2 is rocked from the full line to the dotted line position disclosed by Fig. 2, the transverse member 12 acting as a fulcrum. As the tool is rocked backwardly to the dotted line position its nose 16 raises the engaged link out of engagement with the hook B, thus disconnecting the ends of the chain A.

From the foregoing description it will be understood that I have provided a tool embodying the advantages above pointed out, and while I have shown and described the preferred construction of the device, I reserve the right to make such changes as properly fall within the spirit and scope of the claim.

Having thus described my invention, what I claim and desire to secure by Letters Patent, is:

A tool of the character described consisting of a lever of U-shape configuration in cross section to provide two spaced parallel flanges, a pin uniting said flanges near one end and constituting a fulcrum, a flat transverse member uniting said flanges near the other end to constitute a fulcrum, a nose on the flanges extending forwardly of the last-mentioned fulcrum, and a series of shoulders on the lever.

In testimony whereof I affix my signature, in the presence of two witnesses.

LEROY D. FALCONER.

Witnesses:
L. J. FISCHER,
F. C. FISCHER.